Patented May 21, 1935

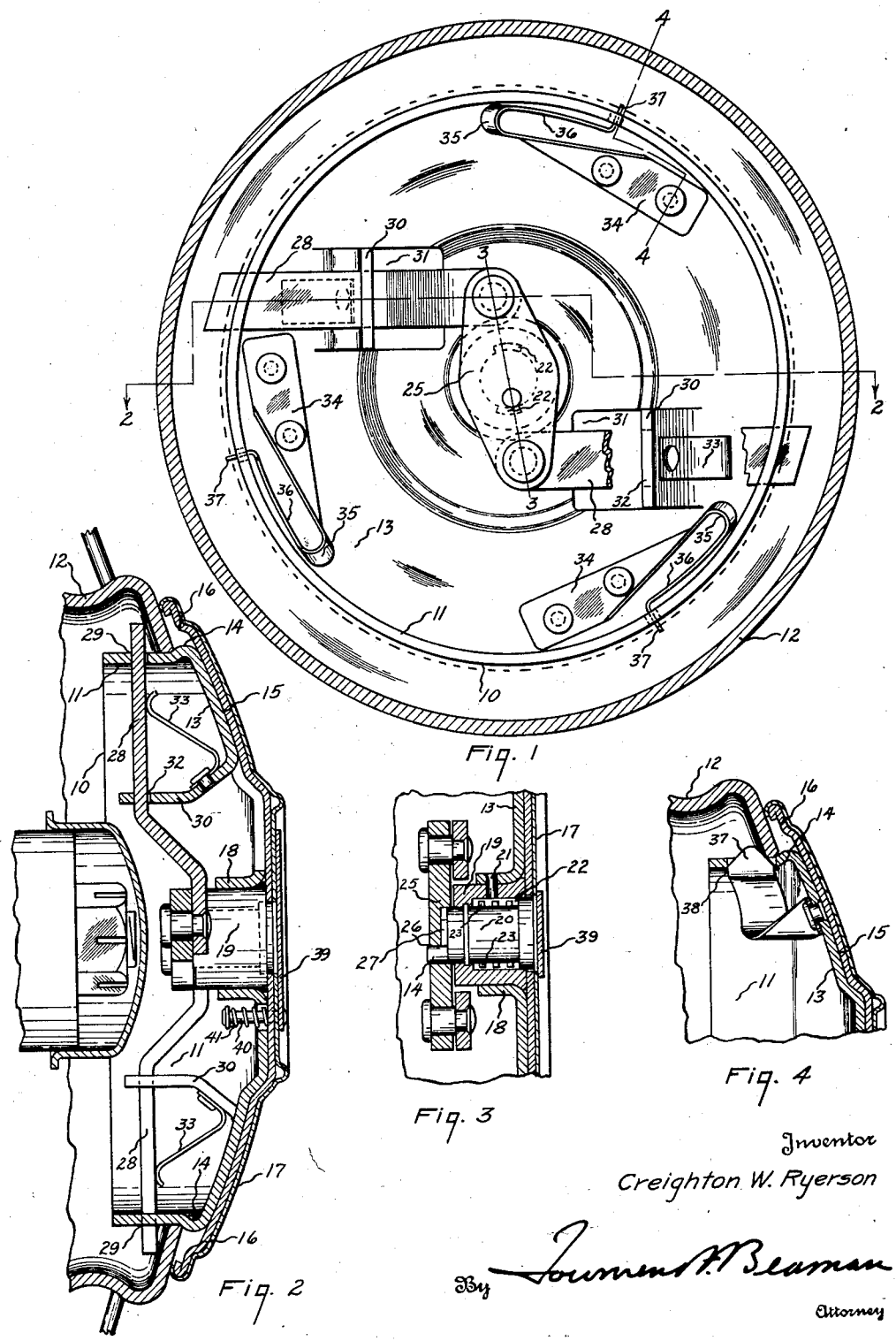

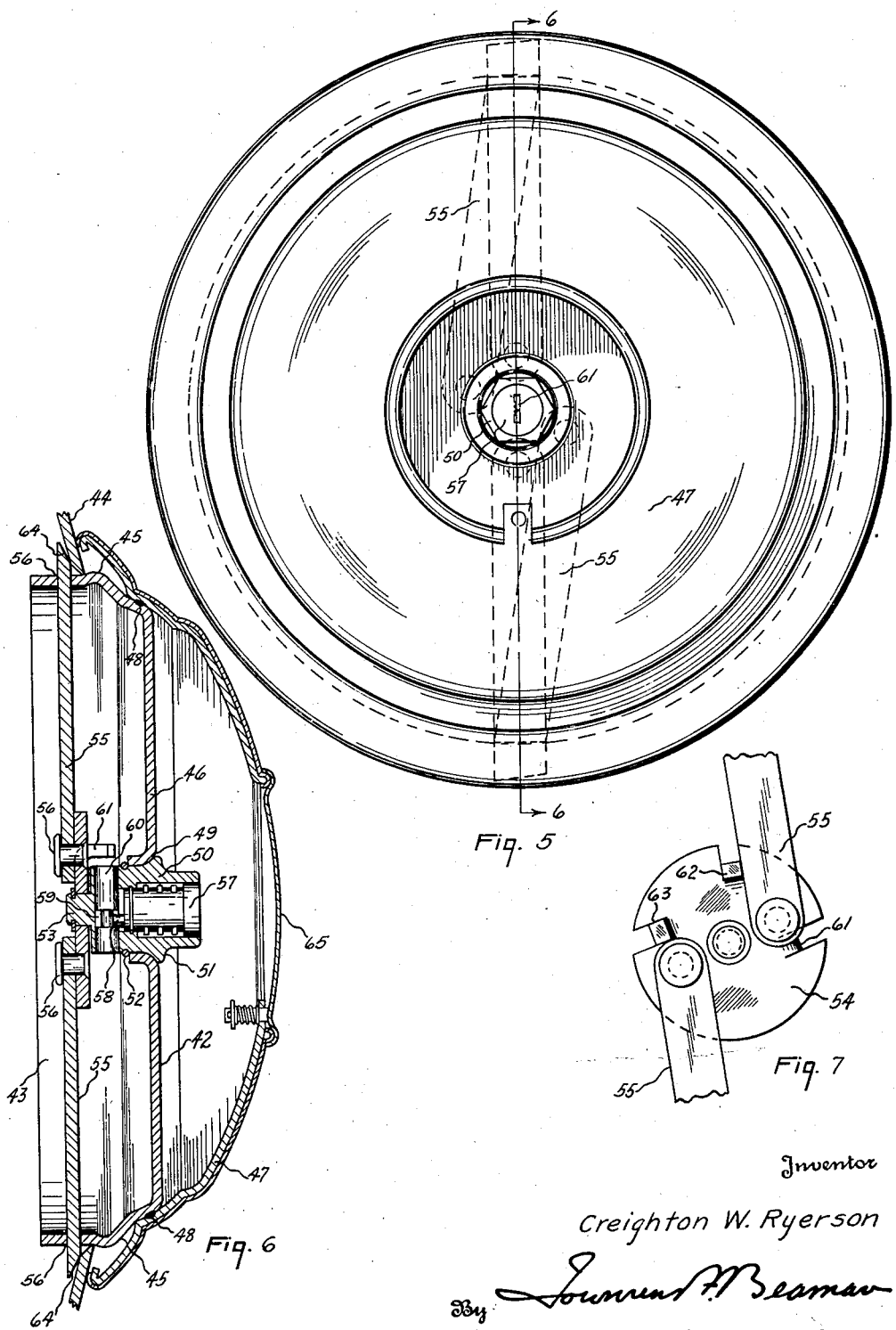

2,002,159

UNITED STATES PATENT OFFICE 2,002,159

HUB CAP

Creighton W. Ryerson, Jackson, Mich., assignor to Ryerson & Haynes, Inc., Jackson, Mich., a corporation of Michigan Application February 24, 1934, Serial No. 712,734

4 Claims. (Cl. 301—108)

The present invention relates to improvements in hub cap structure for vehicle wheels having particular reference to hub caps having locking mechanisms to prevent unauthorized removal of the running or spare wheels.

Hub caps of the above described character heretofore employed when positioned within the hub of the wheel and locked in position have proven to be subject to removal by unauthorized persons with relatively little effort. This has been due largely to the fact that the hub cap is provided with a flange edge which overlaps the edge of the aperture in the hub a considerable distance permitting tools to be inserted and considerable leverage exerted tending to tear and distort the cap to such a point that the locking characteristics are destroyed and the cap may be removed.

Thus it becomes the primary object of the present invention to provide a locking hub cap which overcomes the above criticism of the present type of hub cap. This is accomplished by having a relatively heavy body portion which is insertable into the aperture of the wheel and presents substantially no appreciable flange or other protuberances against which a leverage may be exerted. To give the hub cap a familiar appearance, a face plate is affixed to the heavy body portion to provide a flanged edge overlapping the aperture in the wheel hub. With the hub cap unlocked and of the snap-in type, a screwdriver or similar tool may be inserted under the flanged edge of the face plate to exert a leverage to remove the hub cap. However, with the hub cap locked in position any excessive application of force will result in the face plate being torn off leaving the substantially unexcessible heavy body portion of the hub cap still securely locked in the aperture of the wheel hub.

Another object of the invention resides in a novel locking mechanism for the hub cap.

These and other objects and advantages reside in the novel arrangement and combination and construction of parts as will be more fully described in the following paragraphs. The invention is clearly defined in the appended claims.

In the drawings, wherein one practical embodiment of the invention is disclosed by way of illustration, Fig. 1 is a cross-sectional view taken through the wheel hub with the hub cap in position as viewed from the inside.

Fig. 2 is a cross-sectional view taken on line 2—2 of Fig. 1.

Fig. 3 is a cross-sectional view of the locking cylinder taken on line 3—3 of Fig. 1.

Fig. 4 is a cross-sectional view taken on line 4—4 of Fig. 1 showing the novel type of snap member.

Fig. 5 is a modified type of hub cap embodying the feature of the present invention.

Fig. 6 is a cross-sectional view taken on lines 6—6 of Fig. 5.

Fig. 7 is an enlarged detail of construction.

Having specific reference to the drawings, the hub cap comprises a body portion 10 preferably fabricated from relatively heavy gage sheet metal. A circular flange 11 is provided of an outside diameter to be snugly received within the aperture in the wheel hub 12. The face portion 13 of the body 10 is of slightly greater overall diameter than the aperture in the wheel hub; there being an annular bead or shoulder 14 defined between the flange 11 and face 13 to prevent the body 10 from being passed through the hub aperture.

An outer face plate 15, preferably of considerable lighter gage sheet metal than the body 10, is spot welded or otherwise suitably affixed to the face portion 13 providing an overhanging annular flange 16. This plate imparts an acceptable appearance to the hub cap and conceals the bead 14 as well as the aperture in the wheel hub. An ornamental plate 17 may be extended over the face plate 15 with its periphery crimped over that of the plate.

A sleeve 18 is formed centrally of the face portion 13 in which is received a housing 19 for the locking cylinder 20. This housing is firmly held in a fixed position in the sleeve 18 through a pin 21 or other suitable means and is provided with slots 22 in which the key retractable instrumentalities 23 of the locking cylinder are receivable to prevent relative rotation between the cylinder 20 and the housing 19. The cylinder 20 is rotatably supported in the housing 19 and is equipped with an eccentric pin 14 freely received in an aperture 26 in the bar 25. To provide the bar 25 with a fixed axis of rotation concentric with that of the cylinder 20, a circular recess 27 is provided in the bar in which the end of the cylinder 20 is received to constitute a pivot.

Retractable locking arms 28 are pivotally attached to the opposite ends of the bar 25 being supported and guided through aperture 29 in the flange 11 by bracket members 30 which may be formed integrally with the body 10 by lancing a strip of material from 31 of the face portion 13 and deflecting the same downwardly. The brackets 30 are provided with slots 32 through which the arms 28 are longitudinally guided and supported. Anti-rattle springs 33 may be provided to bear adjacent against the arms 28 to obviate any objectionable looseness.

As I contemplate the extension and retraction of the locking arms 28 solely by the turning of the key in the locking cylinder, the aperture 29 and the arm 28 are of such location and dimension that the arms 28 in the extended position do not contact the inside of the wheel hub unless the hub cap is attempted to be removed with the arms 28 in the extended position.

In order to releasably retain the hub cap in position within the wheel hub and to prevent rattling, snap spring members 34 are provided which are conveniently attached to the inside of the face portion 13 adjacent the flange 11. The free ends of these members are given a quarter turn and return bent as at 35 to provide a cantilevered spring portion 36 having terminal lugs 37 with beveled edges. These lugs are adapted to extend through slots 38 (see Fig. 4) in the flange 11 and engage behind the edge of the aperture in the wheel hub to firmly hold the hub cap in position.

The lock cylinder 20 is of well known construction and is provided with a key way which may be normally covered by a removable plate 39 of suitable construction which is illustrated as being pivoted upon a pin 40 and urged into position by a spring 41.

The design of the foregoing described structure is such that with the arms 28 retracted, a screwdriver or other suitable tool may be inserted under the flange 16 and the hub cap removed. However, with the hub cap locked within the wheel hub any unauthorized attempt to remove the cap by exerting a leverage upon the flange 16 will result only in the distortion or perhaps the tearing of the face plate from the face portion 13 leaving the body 10 of the hub cap still intact. As the bead 14 does not offer a surface against which an effective purchase may be directed, the removal of the body 10 is rendered excessively difficult.

In the modification shown in Figs. 5 and 6, the hub cap, although of the push-on type, does not depend upon spring members to retain the same in position but in lieu thereof is held in position by the locking mechanism. A heavy gage sheet metal body portion 42 is provided with an annular flange portion 43 which is insertable into the opening in the hub 44. A slight annular bulge 45 is provided in the flange 43 to prevent the body 42 from passing through the opening in the hub. As is clearly shown in Fig. 6, the face 46 of the body 42 closes the opening in the hub 44.

To provide the desired appearance and contour to the body and, as in the case of the plate 15, to provide an overlapping flange portion back of which a tool may be inserted to assist in authorized removal of the hub cap, a face plate 47 is provided of concavo-convex shape which is welded or otherwise secured to the body 42 as at 48. This face plate is likewise of lighter gage metal than the body 42 and any unauthorized attempted removal of the hub cap will result in the face plate being torn off or distorted beyond the point where an effective leverage may be exerted between its overlapping peripheral flange and the wheel hub, leaving the body 42 still in position.

The central portion of the body 42 is drawn at 49 to provide a bearing for the freely rotatable shaft 50 having an enlarged diameter at 51 to support the axial thrust in one direction. For locating the shaft 50 in position, an annular groove is provided in the shaft at the end of the bearing 49 to receive a split steel ring 52. The diameter of the shaft 50 is reduced at 53 and a plate 54 is freely supported thereupon for relative rotation between the parts. Locking arms 55 are pivotally attached to the plate 54 by rivets 56 or other suitable means and, upon rotation of the plate 54 in opposite directions, are extended and retracted, being guided at the outer ends through slots 56 in the flange 43.

A locking cylinder 57, of well known construction, is located within the shaft 50 having an eccentric pin 58 which is adapted to engage the side walls of a circular groove 59 in the plunger 60 slidably supported in the shaft 50. The locking cylinder 57 is rotated by a key inserted in the key hole 61 at the outer end of the cylinder which results in the extension and retraction of the plunger 60 by the eccentric pins 58; the locking cylinder being of the type permitting the key to be removed with the cylinder in two positions, namely, with the plunger 60 extended or retracted.

An abutment 61 carried by the plate 54 projects into the plane of the plunger 60 and is adapted to be engaged by the plunger 60 in the extended position rotating the plate 54 to extend or retract the locking arms depending upon the direction of rotation of the shaft 50. Stops 62—63 are carried by the plate 54 and engage the arms 55 to limit the rotation of the plate 54 in either direction to definitely fix the extended and retracted position of the arms 55. It is to be noted that the ends of the arms 55 are beveled at 64 to assist in effecting a drawing in of the hub cap into the wheel hub when the arms are extended through the rotation of the shaft 50. In Fig. 5 the usual swingable cover 65 is shown completely removed from the face plate 47 with the outer end of the shaft 50 being illustrated as of hexagon configuration engageable by a socket wrench to facilitate rotation.

With the arms 55 locking the hub cap in position, as shown in Fig. 6, the plunger 60 is in the retracted position and the shaft 50 may be freely rotated without retracting the arms 55. In order to remove the hub cap, it is necessary to partially rotate the locking cylinder 57 through the use of a key extending the plunger 60 into the path of the member 61. With the plunger 60 in this position, rotation of the shaft 50 in one direction results in the rotation of the plate 54 as a unit therewith upon engagement of the plunger 60 with the member 61 retracting the arms 55. The hub cap is locked in position by the reverse of this operation as should be obvious.

The modified structure just described has the advantage that the body 42 is substantially of solid construction; this giving a high strength to weight ratio. Also, as considerable torque may be readily applied in the rotation of the shaft 50 through the use of a wrench affixed to the hexagonal outer end, the drawing in action upon the body 42 as the arms 55 are extended to effect a camming action upon engagement with the inside of the wheel hub, results in the hub cap being solidly positioned within the wheel hub. This acts as an additional safeguard against unauthorized removal resulting from a tool being inserted between the body 42 and the hub.

Having described my invention, what I claim as new and desire to protect by Letters Patent is:

1. In a hub cap of the push-on type, a strong sheet metal body portion partially insertable into the aperture of the wheel hub and having a face portion for shielding said aperture, a portion of said portion being slightly larger than said aperture to prevent complete insertion of said body into said aperture, a relatively weaker sheet metal face plate overlying said face portion and being attached thereto, the periphery of said plate overlapping said face portion to provide a flange to permit the insertion of a tool between the same and the hub to remove the hub cap from said aperture, locking mechanism mounted in said body for locking the latter within said hub, the construction of said face plate and attachment with said body being characterized by the fact that attempted removal of the cap through force directed against said face plate while said cap is locked to said hub will only result in the removal or distortion of said plate.

2. In a hub cap of the push-on type, a body portion including means partially insertable into the aperture of the wheel hub, for shielding the same, means on said body portion to prevent its complete insertion into said hub, means for locking said body portion in said aperture, and a face plate attached to said body wholly outside of, and overlying the hub to provide a flange to permit the insertion of a tool between the same and the hub to remove the hub cap from the aperture, the construction of said face plate and attachment to said body being characterized by the fact that an attempted removal of the hub cap through force directed against the face plate while said cap is locked to said hub will only result in the removal or distortion of said plate.

3. In a hub cap, a body portion including means insertable into the aperture of the wheel hub for shielding the same, means on said body portion to prevent its complete insertion into said hub, means for locking said body in said aperture, and means attached to said body wholly outside of said hub and overlying the hub to provide a surface against which a tool may be applied to remove the hub cap from the aperture when unlocked, the construction of said last means and attachment to said body characterized by the fact that an attempted removal of the hub cap through force directed against said last means while said cap is locked to said hub will only result in the removal or distortion of said last means.

4. In a hub cap of the push-on type, a sheet metal body portion partially insertable into the aperture of the wheel hub and having a face portion for shielding the aperture, a portion of said portion being slightly larger than said aperture to prevent complete insertion of said body into said aperture, a sheet metal face plate overlying said face portion and being attached thereto, the periphery of said plate overlapping said face portion to provide a flange to permit the insertion of a tool between the same and the hub to remove the hub cap from said aperture, locking mechanism mounted in said body for locking the latter within said hub, the construction of said face plate for attachment with said body being characterized by the fact that attempted removal of the cap through force directed against said face plate while said cap is locked to said hub will only result in the removal or distortion of said plate.

CREIGHTON W. RYERSON.